Aug. 13, 1946.

R. A. DAILY ET AL 2,405,736

NONSPILL VENT PLUG

Filed Nov. 6, 1943

INVENTORS
ROBERT A. DAILY
LOUIS G. CROOKS
BY Spencer, Hardman & Fehr
Their ATTORNEYS Patented Aug. 13, 1946

2,405,736

UNITED STATES PATENT OFFICE 2,405,736

NONSPILL VENT PLUG

Robert A. Daily and Louis G. Crooks, Muncie, Ind., assignors to General Motors Corporation, Detroit, Mich., a corporation of Delaware Application November 6, 1943, Serial No. 509,240

1 Claim. (Cl. 137—139)

This invention relates to non-spill vent caps for storage batteries to prevent spilling of electrolyte when the battery is tilted abnormally, as in airplane use, while providing for the venting of the battery when substantially upright.

It is an object of the present invention to provide a vent control valve which is closed by the action of a weight movable in response to abnormal tilting of the battery, and will invariably return to open position by action of the weight when the battery is returned to a normal position. To accomplish this object, means are provided for the relief, during return of the battery to a normal position, of the pressure of gas accumulating in the battery while tilted abnormally, so that return of the valve to open position by the weight will not be prevented by gas pressure.

Another object of the present invention is to provide a non-corrosive ball and socket joint between the weight and a valve operating rod and also to isolate the joint whereby deposits of corrosive matter are prevented from collecting around the joint to bind or otherwise interfere with the proper functioning of the valve mechanism to close a vent opening when the battery is tilted abnormally or to open the vent opening when the battery is in a normal position.

Further objects and advantages of the present invention will be apparent from the following description, reference being had to the accompanying drawing wherein a preferred embodiment of the present invention is clearly shown.

Figure 1:
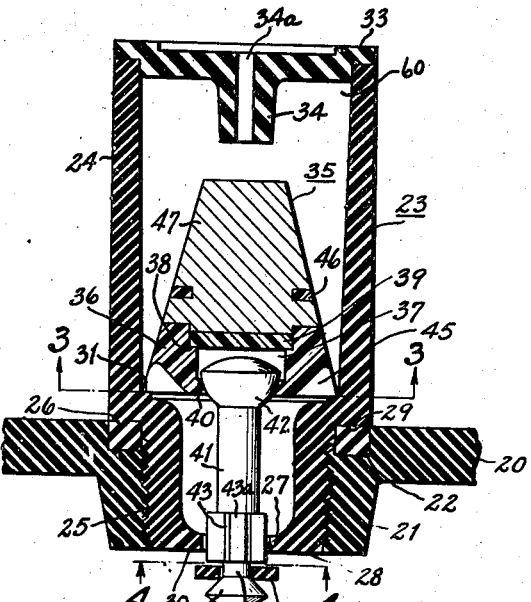
Fig. 1 is an enlarged sectional view illustrating a non-spill vent cap embodying the present invention attached to a cover of a cell, only a fragment of the cover is shown, and showing the cover in its normal upright position.
Figure 3:
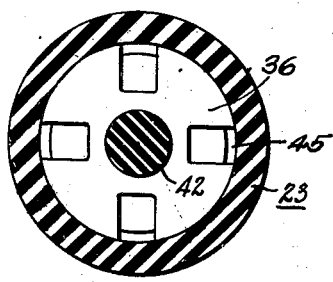
Figure 4:
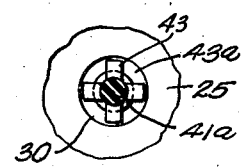

Figs. 3 and 4 respectively are sectional views taken on lines 3—3 and 4—4 of Fig. 1.

Referring to the drawing 20 designates a top wall of a cell cover for a battery cell containing liquid electrolyte. The cover 20 is provided with an internally threaded opening 21 which is rabbeted at its upper end to receive a soft rubber gasket 22.

A vent plug body 23 is molded from an acid resisting compound which will retain its shape when subjected to relatively high temperatures. The body 23 comprises an enlarged hollow portion 24 and a reduced hollow portion or tube 25 formed integral with the portion 24 and provides a shoulder 26. The reduced portion 25 is externally threaded to fit into the threaded opening 21. The lower end of the tube 25 is provided with an internal flange 27 the outer face of which provides a flat valve seat 28. The shoulder 26 is provided with a depending annular ridge 29 which bites into the soft rubber gasket 22 when the body is threaded into the cover to form an effective liquid seal, and thus blocks liquid electrolyte that might trickle past the threads from passing to the outside of the cover. The internal flange 27 forms an opening or outlet 30, centrally of the valve seat 28, and said outlet provides communication between the interior of the cell and the interior of the body 23. The interior of the portion 24 is formed with an annular shoulder or ledge 31 located a substantial distance above the valve seat 28. The interior of the portion 24 above the ledge 31 slopes upwardly to the upper end of the body 23. This upper open end receives a cover 33 having a cylindrical projection 34 depending from its lower side through which a vent opening 34a passes so that the interior of the body 23 will have communication with outside atmosphere. The cover 33 is secured in position to the body 23 in any suitable manner. The purpose of the interior slope of the portion 24 is to provide an easy assembly of a weight and valve assembly 35 within the body which normally rests upon the shoulder 31 and to provide a shape which can be easily molded.

The weight and valve assembly 35 in this instance comprises a base 36 having an opening 37 through an internal shoulder 38 upon which rests a baffle or disc 39. The lower portion of the opening 37 is tapered or rounded inwardly as at 40, so as to provide a reduced opening. Before the disc 39 is assembled with the base 36, a valve rod or stem 41 having a head 42 at one end, an abutment 43 provided with longitudinal flutes or grooves 43a, a reduced portion 41a the periphery of which extends slightly below the bottoms of the grooves, and a frusto-conical valve rest 44, is assembled with the base. The cross dimensions of the abutment 43 and the rest 44 are such that they will pass easily through the reduced portion of the opening 37 but the spherical portion of the head 42 engages the tapered portion 40 to limit the downward movement of the stem. The head 42 and the tapered portion 40 form a ball and socket connection or a universal joint permitting the rod 41 to rock in any direction relative to the base 36. The cross dimensions of the abutment 43 is such that it will also pass easily through the opening 30 to permit the free passage of gas therethrough. The lowermost end of the abutment normally extends beyond the seat 28 as shown in Fig. 1. When the baffle 39 is assembled to the base it forms a pocket for isolating the ball and socket joint from deposits of corrosive matter. Like the body 23, the parts 38, 36, 39 and 41 are molded of acid resisting compound.

The base 36 normally rests on the ledge 31 and the periphery of the base is provided with spaced passages 45 to provide a communication between the space below the ledge with the space above the ledge when the base rests upon the ledge 31. It is to be understood however that the base could be formed without the passages 45 and that suitable passages could be formed in the housing 24 so that they will extend above and below ledge 31 to provide the necessary communication between the spaces below and above the ledge 31 when the base 36 rests thereon. The base 36 in this instance is provided with lateral openings 46 to receive anchoring means for a heavy element or body 47 such as antimonal lead or other heavy material impervious to electrolyte. The lead body 47 is cast to the base 36 after the valve stem 41 and baffle 39 are assembled in position within the base.

The particular form of weight assembly illustrated is in the form of a truncated cone with the bottom of the light weight base 36 normally resting on the shoulder 31. The shape of the weight assembly need not necessarily be truncated provided there is sufficient clearance between the weight and the lateral wall of the body to permit the weight to tip over through the desired angle.

The weight, by action of gravity, will always rest on the shoulder when the battery is substantially in its upright position. The metal cast to the base 36 extends a substantial distance above the base so that the center of gravity of the weight is located substantially above the light weight base 36. Thus, when the cell is tilted from the vertical through a certain angle, a position will be reached where the vertical line through the center of gravity of the weight will pass outside of its supporting base and the weight will tip over to the position shown in Fig. 2.

At the lower end of the stem 41 a resilient, washerlike valve member 50, preferably of soft rubber, is supported between the conical rest 44 and the lower edges of the abutment 43. Valve 50 has merely a cylindrical hole through its center; and it is assembled to the rod 41 after same extends through the opening 30 of the housing by forcing same over the rest 44. The diameter of the cylindrical hole in valve 50 is substantially greater than the rod portion 41a and the diameter across the bottoms of the grooves 43a. When valve 50 engages the rest 44, there is clearance between the upper side of valve 50 and the lower side of abutment 43. Therefore, when the lower side of abutment 43 engages the upper side of valve 50, there is a vent between the rod portion 41a and the valve 50 and through the grooves 43a.

Figure 2:
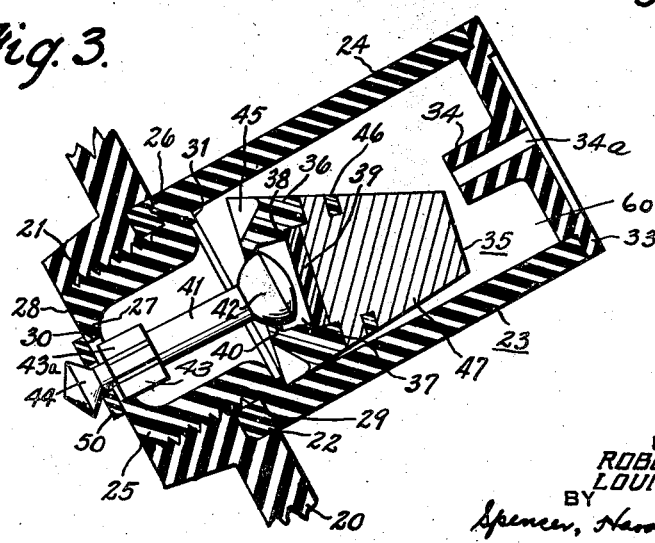
Fig. 2 is a view similar to Fig. 1, but showing the battery in a tilted position and the vent cap closed.

The operation of the device is as follows: When the battery is tilted beyond a predetermined angle from the vertical in any direction, the tiltable weight 47 by action of gravity automatically moves the stem 41 axially with respect to the valve seat 28 and causes the upper face of the valve washer 50 to bear against the valve seat 28 to close the opening 30 to prevent any liquid electrolyte from entering into the interior of the body. If a small quantity of liquid should escape before the outlet 30 is closed by the valve 50, it will be retained in the space 60 in case the cell is inverted, and, on restoring the cell to its normal upright position, this liquid will drain back to the cell through the passages 45 and grooves 43a. When the weight is tilted, as shown in Fig. 2 the upper frusto-conical portion of the rest 44 makes line contact with the lower edge of the marginal wall of the cylindrical aperture of the valve 50 to block completely the flow of liquid past the valve into the interior of the body 23. The valve 50 being of soft rubber-like material, will shape itself automatically by the force applied by the weight so as to conform to the rest 44. In fact, when the stem 41 is inclined as shown in Fig. 2, the line of contact of the valve with the rest will be slightly elliptical. The contact of the valve with the rest being normally a circle-line contact, the unit pressure upon the valve 50 is sufficient to change the circle-line contact into one which is slightly elliptical although the total force applied by the weight is relatively small. Thus a good seal is provided between the valve 50 and the rest 44. The valve 50 being of relatively soft, rubber-like material, and the valve-closing force of the weight being applied to the valve near the center thereof, the peripheral portion of the valve adjusts itself to the seat 28.

When the cell is in the tilted position as shown in Fig. 2 the pressure exerted by the liquid within the cell upon the valve is greater than the atmospheric pressure within the housing 23 due to the fact that the liquid within the cell bears against a greater area of the valve 50 than does outside atmosphere. This difference of pressures will force out any air between the upper surface of the valve and the seat so as to create a vacuum which will tend to hold the valve in its closed position until the cell is returned to its upright position.

When the cell is returned to its normal or vertical position the weight 47 will drop by gravity toward the shoulder 31. As the weight approaches its normal position of rest the disc 39 will first engage the head 42 to move the valve rod downwardly causing the valve rest 44, due to lost motion, to leave the valve disc 50 as vacuum holds the valve against the seat 28. Since the cross dimension of the aperture in the valve is greater than the reduced portion 41a of the valve rod and is greater than the diameter across the bottoms of the notches 43a, a vent is provided to permit the escape of any gas under pressure which had accumulated in the cell while the battery was abnormally tilted. As the weight nears its normal position of rest upon the shoulder 31, the abutment 43 taps the upper face of the valve 50 with sufficient force usually to destroy the vacuum and move the valve downwardly from its seat 28. However should the vacuum be sufficient to hold the valve 50 against the seat 28 and to support the weight, an additional force, such as caused by vibrations, will cause the abutment 43 to act upon the valve 50 to destroy the vacuum. The vacuum being thus relieved, the valve 50 will drop against the rest 44 to allow gas to escape around the valve and through the longitudinal grooves 43a in the abutment 43.

From the foregoing description, it is apparent that full advantage is taken of the movement of the weight to open the vent when the battery is tilted back to a normal position. Because the valve 50 has substantially only line contact with the rest 44 in the position shown in Fig. 2, the seal between the parts 50 and 44 is readily broken by the hammer-like effect of the weight upon the rod 41 which occurs when the disc 39 strikes the head 42 of the rod. This seal having been broken and gas pressure relieved, the valve 50 is retained upon its seat 28 solely by vacuum. Because the rod portion 41a can move freely through the valve 50 without appreciable friction, the rod 41 and the weight continue their movement together to cause the abutment 43 to strike the valve 50 with force usually sufficient to separate the valve from the seat 28. The normal sequence of operations is movement of the weight alone until lost motion between the weight and the rod is taken up, movement of the weight and rod together until lost motion between the rod and the valve is taken up and movement of the weight, rod and valve together. If the valve 50 should adhere to its seat 28 for a brief period until shaken loose by vibrations, no harm is done since the battery is vented by separation of rest 44 from the valve 50 through the space between the valve 50 and the rod portion 41a and through the grooves 43a in the abutment 43.

While the embodiment of the present invention as herein disclosed constitutes a preferred form, it is to be understood that other forms might be adopted, all coming within the scope of the claim which follows.

What is claimed is as follows:

A non-spill vent plug for a container of a liquid which evolves gas comprising a tubular housing adapted to be secured to the cover of the container and having a vent-passage therethrough and providing at the inner end thereof a flat, annular valve seat surrounding said vent-passage and facing the interior of the container; a weight supported within the housing between the ends thereof and capable of tilting movement upon the housing toward the lateral wall thereof when the housing is inclined at a certain angle from the vertical; a rod having a lost motion connection with the weight and extending through the valve seat and providing a grooved abutment portion, a reduced portion having a diameter substantially that across the bottoms of the grooves of the abutment and having at its free end a frusto-conical valve rest facing the abutment and spaced therefrom by the reduced portion; a flat, disc-valve of resilient material having a central, cylindrical hole greater in diameter than the diameter across the bottoms of the grooves of the abutment and greater than the diameter of the reduced portion, the outer surface of the valve being spaced from the abutment when the inner edge of its cylindrical hole engages the rest provided by the rod, the tilting of the housing to a certain angle causing the weight to move the rod outwardly whereby the rest is urged against the inner edge of the hole in the valve to form a seat and whereby the peripheral portion of the valve engages the seat surrounding the vent-passage in the housing to form a seal and whereby the plunger portion is spaced from the valve, the return of the housing toward vertical position causing the weight to move by itself to take up lost motion in the return direction between itself and the rod and thereby to tap the rod to break the seal between the valve rest of the rod and the valve while the valve remains in engagement with the seat provided by the housing, and causing the weight and rod to move together without appreciable retardation by the valve to take up lost motion between the abutment portion of the rod and the valve thereby to tap the valve to break the seal between the valve and the seat provided by the housing.

ROBERT A. DAILY.
LOUIS G. CROOKS.